United States Patent [19]
Uetake et al.

[11] Patent Number: 5,377,245
[45] Date of Patent: Dec. 27, 1994

[54] METHOD OF OPERATING BWR PLANT, BWR PLANT AND METAL ELEMENT INJECTING APPARATUS

[75] Inventors: Naohito Uetake, Katsuta; Makoto Nagase, Mito; Masayoshi Kondoh, Hitachi; Toshio Sawa, Hitachi; Shunsuke Uchida, Hitachi; Yamato Asakura, Katsuta, all of Japan

[73] Assignee: Hitachi, Ltd., Tokyo, Japan

[21] Appl. No.: 137,975

[22] Filed: Oct. 19, 1993

[30] Foreign Application Priority Data

Oct. 20, 1992 [JP] Japan ................................. 4-281305

[51] Int. Cl.$^5$ ................................................ G21C 9/00
[52] U.S. Cl. ..................................... 376/305; 376/306
[58] Field of Search ........................ 376/310, 305, 306

[56] References Cited

U.S. PATENT DOCUMENTS 5,130,081 7/1992 Niedrach ............................ 376/305
5,135,709 8/1992 Andresen et al. ................... 376/305

FOREIGN PATENT DOCUMENTS 4-1599 1/1992 Japan.

Primary Examiner—Donald P. Walsh
Assistant Examiner—Frederick H. Voss
Attorney, Agent, or Firm—Antonelli, Terry, Stout & Kraus

[57] ABSTRACT

An object of the present invention is to provide a method and a nuclear plant capable of preventing deposition and activation of crud to a nuclear fuel rod and decreasing the radioactivity level in reactor water. Metal ions solely having a low deposition rate coefficient are made to coexist to prevent or decrease deposition of radioactive corrosion products to the nuclear fuel rod. A method and a nuclear plant capable of preventing deposition and activation of crud to the nuclear fuel rod and decreasing the radioactivity level in reactor water can be provided.

32 Claims, 5 Drawing Sheets

METHOD OF OPERATING BWR PLANT, BWR PLANT AND METAL ELEMENT INJECTING APPARATUS

BACKGROUND OF THE INVENTION

1. Field of the Invention

The present invention relates to a method of operating a boiling water reactor (hereinafter referred to as "BWR") plant and to a BWR plant, and more particularly to a method of operating a BWR plant and to a BWR plant with both of which the radioactive concentration level during the operation can be reduced or the exposure dose at the time of handling the nuclear fuel rod can be reduced.

2. Background of the Invention

In a BWR plant, nickel and cobalt corrosion products in the form of ions are generated from structural material of a feed and condensed water system, the corrosion products being deposited to a nuclear fuel rod and activated. The radioactive nuclei are dissolved from the nuclear fuel rod and deposited onto the reactor core structural materials and primary coolant piping. As a result, the exposure rate during the periodical inspection increases. In order to prevent this, in a conventional technology the injection of iron crud is effected. By making use of a fact that the radioactive ions are fixed when a ferrite is formed, the concentration of the radioactive ions has been decreased. A conventional technology of the foregoing type has been disclosed in Japanese Patent Laid-Open No. 60-78390.

However, in the conventional technique, a large quantity of crud is deposited to the nuclear fuel rod, causing the following problems at the time of treating the spent nuclear fuel rod.

First, a large quantity of waste occurs in a decontamination working, which is performed in a power plant for the purpose of transporting the spent nuclear fuel rod to a reprocessing plant. Further, the exposure dose for operators increases.

The iron acts as an interfering substance in the fuel reprocessing process.

A second problem is that the radioactive ions in the reactor water cannot be reduced satisfactorily and the concentration of the iron crud in the reactor core is increased. As a part of iron crud contain radioactive nucleid, high concentration of iron crud becomes radiation source as a radioactive precipitate.

SUMMARY OF THE INVENTION

Accordingly, a first object of the present invention is to minimize or prevent corrosion products deposition onto the nuclear fuel rod.

A second object of the present invention is to reduce the radioactivity in reactor water.

The foregoing first and second objects can be achieved by injecting metal that minimizes or prevents the corrosion products deposition on the nuclear fuel rod during the operation.

The second object can be realized by injecting metal that reduce the iron crud concentration in reactor water and that minimizes the deposition of the corrosion products onto the nuclear fuel rod during the operation.

The nuclide of a type having a long half life period and a large $\gamma$-ray energy is important. The most critical problem is caused by $^{60}Co$ generated due to the activation of cobalt (Co) with neutrons, and $^{58}Co$ causes a similar problem. However, the half life period of $^{58}Co$ is relatively short and the $\gamma$-ray energy is considerably small as compared with $^{60}Co$, $^{58}Co$ being mainly generated due to activation of nickel (Ni). Therefore, specially the deposition to the fuel and the activation of cobalt and nickel must be considered. In particular, cobalt is most important in order to reduce the exposure dose. Explanation will be concentrated to cobalt ions and nickel ions.

The inventors of the present invention have found the following fact involved in the conventional technology as a result of simulative calculations. FIG. 2 is a graph of the relationship between concentration of iron in feed water and the concentration of $^{60}Co$ ion in reactor water. FIG. 2 shows a result that the concentration of $^{60}Co$ increases conversely as the iron crud concentration is lowered. Although the concentration of $^{60}Co$ in lowest iron concentration area is then somewhat lowered, the concentration cannot be made lower than a level realized in a case where a sufficient high iron crud concentration is attained. That is, the $^{60}Co$ concentration in reactor water cannot be made lower than a level that the iron crud is added as performed in the conventional technology.

In order to overcome the foregoing problem, the inventors have conducted experiments and simulations, and have found that the deposition of metal ions of nickel, cobalt and other added metal which metal ions are the corrosion product in the reactor water, takes place due to generation of bubbles caused from boiling on the surface of the nuclear fuel rod. This is schematically shown in FIG. 3. On the surface of the nuclear fuel rod, bubbles are generated due to boiling, the growth of the bubbles causing metal ions precipitation from water and deposit to the surface of the nuclear fuel rod. When bubbles are apart from the surface of the nuclear fuel rod, water is again brought to the surface of the nuclear fuel rod, and therefore a portion of deposited precipitate is again dissolved in water due to the influence of water. Therefore, if the dominant metal ions can easily be dissolved the coexisting metal ions do not deposit to the surface of the nuclear fuel rod. Accordingly, by adding metal that enhances the remove of the metal ions into water when it coexists with the metal ions, to the metal ions, it becomes possible to prevent or minimize the deposition of the metal ions (see FIG. 3B). FIG. 3B illustrates a case where the coexisting metal ion enhancing the remove into water is not present. According to the fact found by the inventors, much deposition of metal ion takes place in a portion where bubbles are present. Conversely, if the deposition on this portion can be prevented, the deposition of the corrosion products in the overall area of the reactor core can be prevented, so that the activation of the corrosion products can be prevented to reduce the $\gamma$-ray level in reactor water and to thereby reduce the radiation dose in the primary coolant system such as the main vapor system or the recycling system. From the view point of enhancing the elution in the foregoing phenomenon, the elution of the metal ions of the corrosion products is enhanced. From another view point that the deposition is finally prevented, the deposition of the metal ions of the corrosion products is prevented.

The foregoing phenomenon takes place in the overall area of the nuclear fuel rod, and the likelihood of the deposition of the metal ions, which are the corrosion products, to the nuclear fuel rod is determined by the metal ions which are allowed to coexist. As an example of a parameter indicating the likelihood of the deposition, a deposition rate coefficient defined by a dimensionless number expressed by the following equation is available:

$$\text{(deposition rate coefficient)} = \frac{\text{(weight of deposition per unit area for unit time)}}{\text{(metal ion concentration in water)}} \times \frac{\text{(heat of vaporization)}}{\text{(heat flux)}} \quad (1)$$

The first term of the right side shows the result of standardization of the quantity of the deposition with the metal ion concentration, the quantity being basically determined by the characteristics of the metal ion. However, it is also affected by the concentration of another ion allowed to coexist. The second term of the right side denotes the proportion of heat (the heat of vaporization) that has been used to form bubbles with respect to the generated heat (heat flux) at the nuclear fuel rod, which proportion indicates the facility of the generation of bubbles that serves as an important role in the foregoing phenomenon. Therefore, if metal ion has a property readily adhering and if many bubbles are generated, the deposition rate coefficient value will become large. Hereinbelow, description will be made while employing the deposition rate coefficient as the index of the likelihood of the deposition.

The foregoing phenomenon will be again described by making use of the deposition rate coefficient. It is thought that metal ions in usual reactor water are precipitated in the form of oxides or, on the situation, hydroxides. Since precipitated nickel oxides are low in solubility and has high stability with the result that the deposition rate coefficient of nickel oxides alone is low regarding most of the Ni oxides, its precipitate exhibits excellent stability. Since cobalt, which is a component of a slight amount, is deposited while being mixed with the foregoing stable precipitate, cobalt is not considerably dissolved again after bubbles have been apart from the fuel rod, so that, cobalt has a high deposition rate coefficient. In a case where metal ions solely having a low deposition rate coefficient are made to coexist so that a main part of precipitate is composed of the oxide of this metal, a major portion of the components which are most of main components constituting the main part of the precipitate are returned into water when bubbles have been apart with water being replaced therefrom. At this time, the metals, such as the cobalt and nickel each of which originally has a high deposition rate coefficient, are also returned into water, so that a low deposition coefficient lower than the original coefficient can be realized. In order to achieve this, it is necessary to select metal ions of a type having a deposition rate coefficient lower than 0.2 which is the original coefficient of sole nickel.

The effect of the deposition phenomenon to the fuel rod depends upon the reactor water crud concentration and the facility of deposition to the primary coolant system to be described later. Therefore, it is more effective to reduce the quantity of the deposition to the fuel rod by employing the following guide line.

First, the deposition of the corrosion products, such as the crud, nickel ions and cobalt ions, can effectively be prevented by reducing crud concentration in the reactor water. If the iron crud concentration is higher than the concentration of the metal ions, the deposition rate coefficient of each of Co ions and Ni ions is made to be about 0.3 due to the influence of the iron crud concentration. Therefore, even if the quantity of the added metal is somewhat increased, the deposition rate coefficient is not changed. As a result, it is preferable that the iron crud concentration is maintained at a level relatively lower than the metal ion concentration. The crud in reactor water can be lowered to about 0.05 ppb by employing an apparatus, such as a hollow fiber filter, which is capable of precisely removing the crud. Under the foregoing conditions, the deposition rate coefficient is not substantially affected by the presence of the iron crud.

FIG. 4 is a graph of the relationship between the reduction ratio of the cobalt deposition rate and the $^{60}Co$ ion concentration in reactor water in a case where the iron crud concentration is low. In FIG. 4, term "cycle" means an operation period of a nuclear power plant, for example, from a moment at which the operation of the plant is commenced to another moment at which a first inspection period is commenced in which the nuclear power plant stops its operation for a predetermined period for the purpose of performing inspection, the foregoing period being called a "first cycle". In the conventional method, the longer the duration of the operation, that is, the larger the number of the cycle, the more the $^{60}Co$ ion concentration increases and radioactivity in the reactor core increases. FIG. 4 shows the result of a simulation performed in such a manner that the cobalt deposition rate coefficient is lowered in each cycle of the conventional plant. As a result, the $^{60}Co$ concentration is gradually lowered as the deposition rate coefficient decreases. In a case where the deposition rate coefficient is lowered to a level about ⅓ of the original deposition rate, the foregoing concentration can be controlled to a similar or lower level realized in the case where the iron crud concentration is sufficiently high. This case corresponds to a case where the cobalt deposition rate coefficient is made to be 0.01 or lower. By employing this condition, the residual quantity of cobalt on the nuclear fuel rod can be reduced and the $^{60}Co$ concentration in reactor water can be lowered. In order to make the cobalt deposition rate coefficient to be 0.01 or lower, the metal serving the above role is added.

A second guide line will now be described. In a case where the deposition coefficient is too small, only the metal added to the water is dissolved in moisture existing in bubbles even if bubbles are present, while leaving the radioactive ions remaining as it is, so that such a phenomenon occurs that the radioactive ions is not be dissolved. This phenomenon is explained below. The most important factor to determine the deposition rate coefficient of the metal ion is the solubility of the precipitate into water. The higher the solubility is, the lower the stability at the time of the separation of bubbles becomes, so that the deposition rate coefficient becomes lower. From this viewpoint, the oxide of the metal ion which is made to coexist must has a solubility higher than that of NiO. However, a substance having an excessively high solubility is not useful because a slight water remains at the time of the existence of bubbles with the result that the substance of the very high solubility does not precipitate. Experimentally, are alkali metal, such as sodium, does not substantially affect the deposition rate coefficient because of its high solubility. Therefore, it is preferable that the solubility of the oxide (hydroxide) of the metal ion made to coexist is lower than that of $Na_2O$. Further, the concentration of the metal ion made to coexist must be a level which is substantially the same as that of nickel, that is, 1 ppb or higher because it is able to serve as a main component of the precipitate.

A third factor is to prevent the added metal from reacting to form ferrite with the iron oxide in a pipe or the like before the added metal exerts effects on the surface of the nuclear fuel rod. Iron is an element which is the main component of the material of the nuclear reactor, and ion oxides exist on the portions of the pipes and the pressure container that are in contact with water. Thus, metal elements of a type which easily reacts to form the ferrite with the iron oxides in high temperature water is apt to be deposited on the pipes and the like as the ferrite, so that the metal are removed from reactor water. It is preferable to use such metal ions to be made to coexist as hardly reacts to form the ferrite.

From the foregoing second and third viewpoints, it is preferable that a metal to be added is selected from a group consisting of copper, tin, bismuth, cadmium germanium, selenium, mercury, arsenic, gallium, chromium, manganese, lead, antimony, vanadium and tellurium. However, since these elements are activated by neutrons, suitable metal must be selected while taking all of the activation cross sectional area, the half valued period of generated nuclide and the characteristics of radioactive rays into consideration. From this viewpoint, it is preferable to employ copper, tin or bismuth. In a case where the selected metal has isotopes, separation of only the nuclide that does not considerably cause the influence of the activation will further eliminate the influence of the activation, and a proper metal element can be selected while considering the easiness of handling. However, since isotope separation for obtaining necessary nuclide requires a large cost, it becomes possible to decrease the cost by the reproduction and reuse of the added isotope in the reactor water clean-up system by use of an ion exchange resin. The added metal can be separated and removed from the other impurities, such as alkali metal, by using chelate resin, and it is effective that the chelate resin is used in the reactor water clean-up system to capture the added isotope to be reproduced.

A fourth factor will now be described. The added metal ions is lost due to the deposition onto the pipe and the like, and there is a probability that the concentration of the added metal ion becomes excessive due to the continuous injection. In order to prevent these situation and to minimize the amount of the addition, it is effective to adjust the quantity of injection while monitoring the added metal ion concentration by using an ion chromatography or the like. Further, since the deposition rate, coefficient decreases, it is thought that the nickel ion concentration increases with the lapse of time. By simultaneously measuring the nickel concentration to control the ratio to be in a predetermined range, an effective countermeasure against the increase in the nickel concentration can be taken.

Finally, since a large quantity the iron crud has been accumulated in the reactor of the plant which had been operated by use of a conventional process, the added metal ions as they are cannot act effectively. In this case, it is effective to decontaminate the system, to change the nuclear fuel or to effect decontamination so that the crud accumulated in the reactor core is removed.

Other and further objects, features and advantages of the invention will be appear more fully from the following description.

DESCRIPTION OF THE PREFERRED EMBODIMENTS

Figure 1:
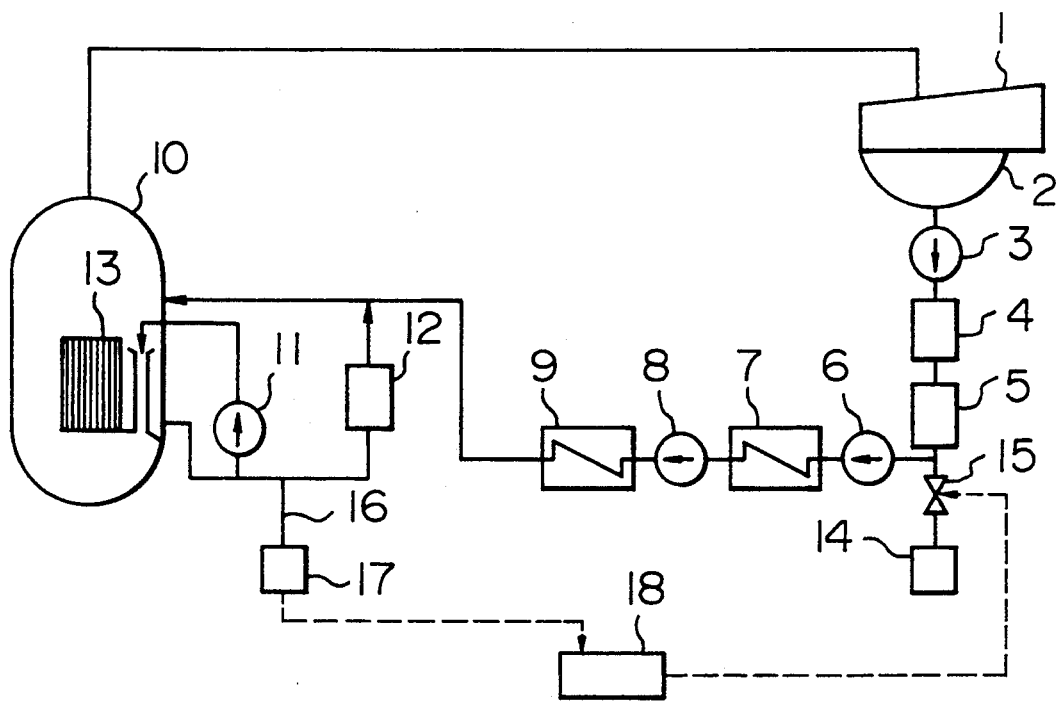
FIG. 1 illustrates an embodiment of the present invention.
Figure 2:
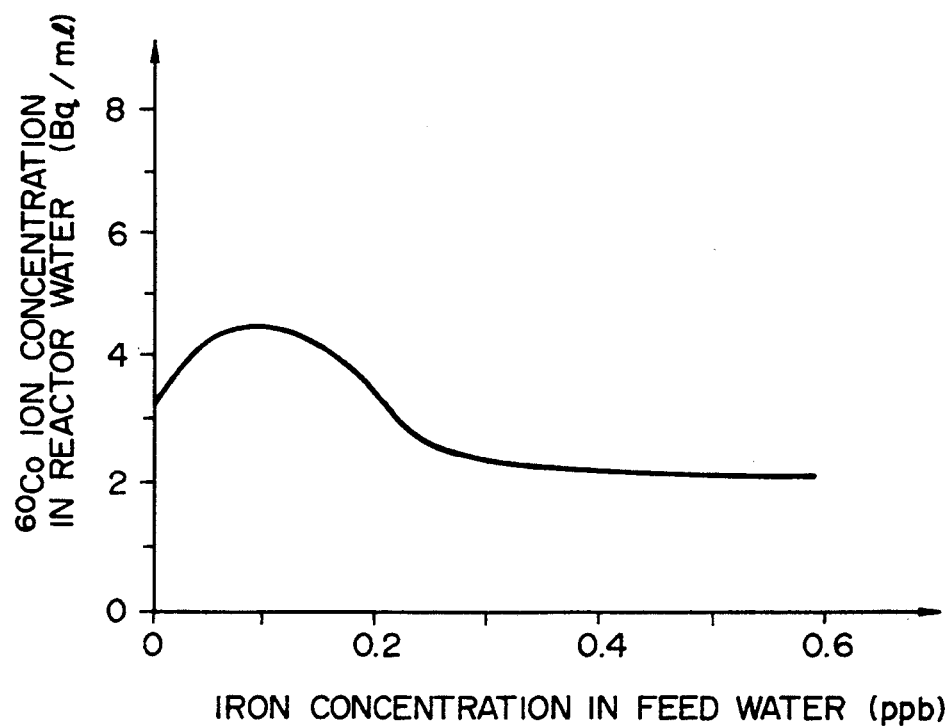
FIG. 2 is a graph which illustrates a result of an example of a simulative calculation of $^{60}Co$ concentration in reactor water with respect to iron crud concentration.
Figure 3A:
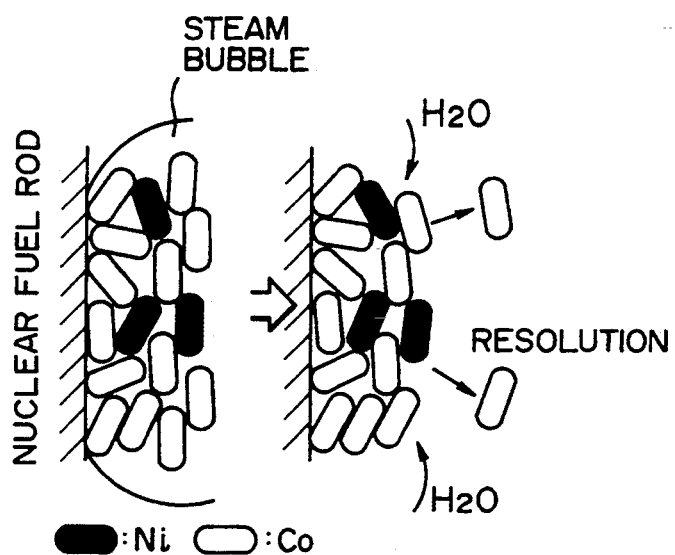
FIGS. 3A and 3B are schematic views illustrating adhesion (deposition) of metal ions onto a nuclear fuel rod and a process for preventing it.
Figure 3B:
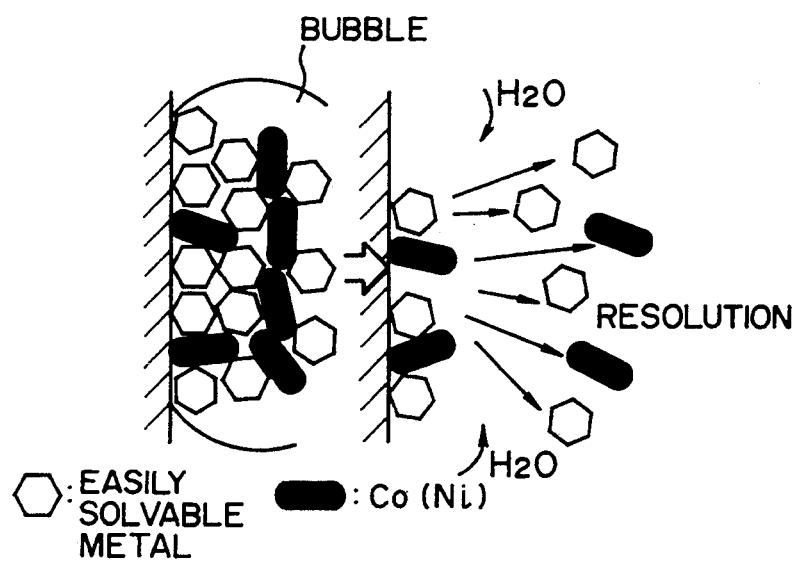
Figure 4:
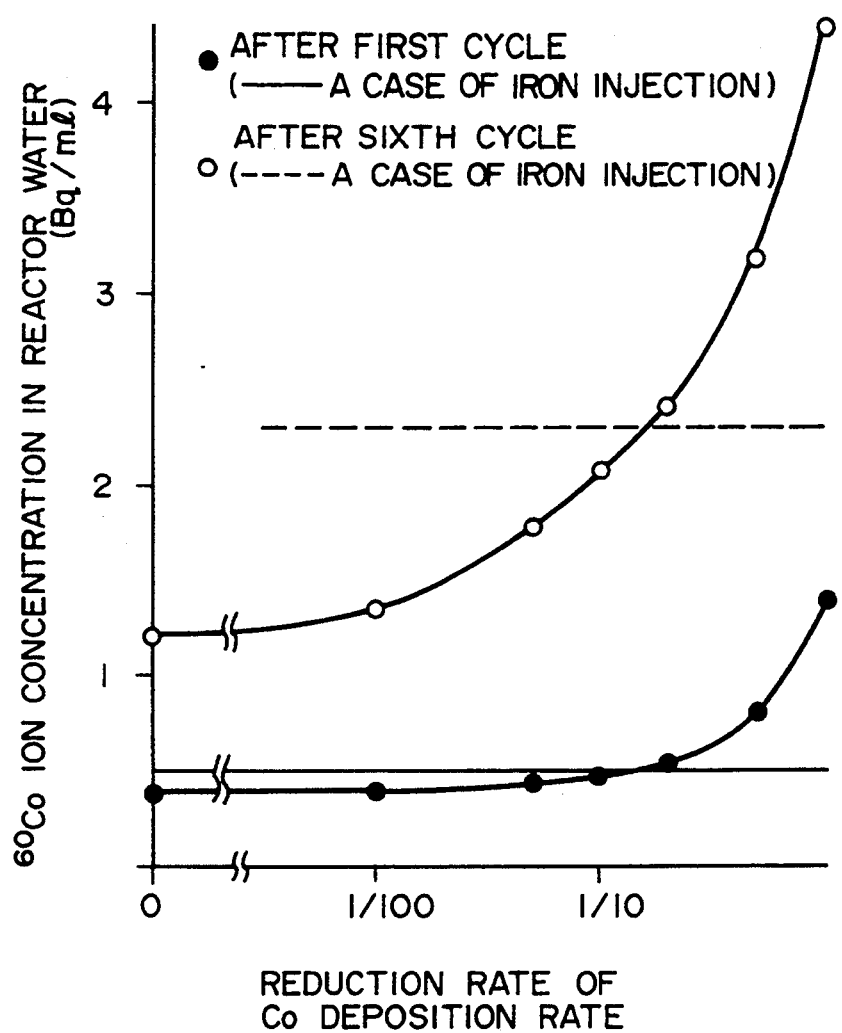
FIG. 4 illustrates a result of an example of a simulative calculation of $^{60}Co$ concentration in reactor water when the deposition rate coefficient of cobalt is lowered.
Figure 5:
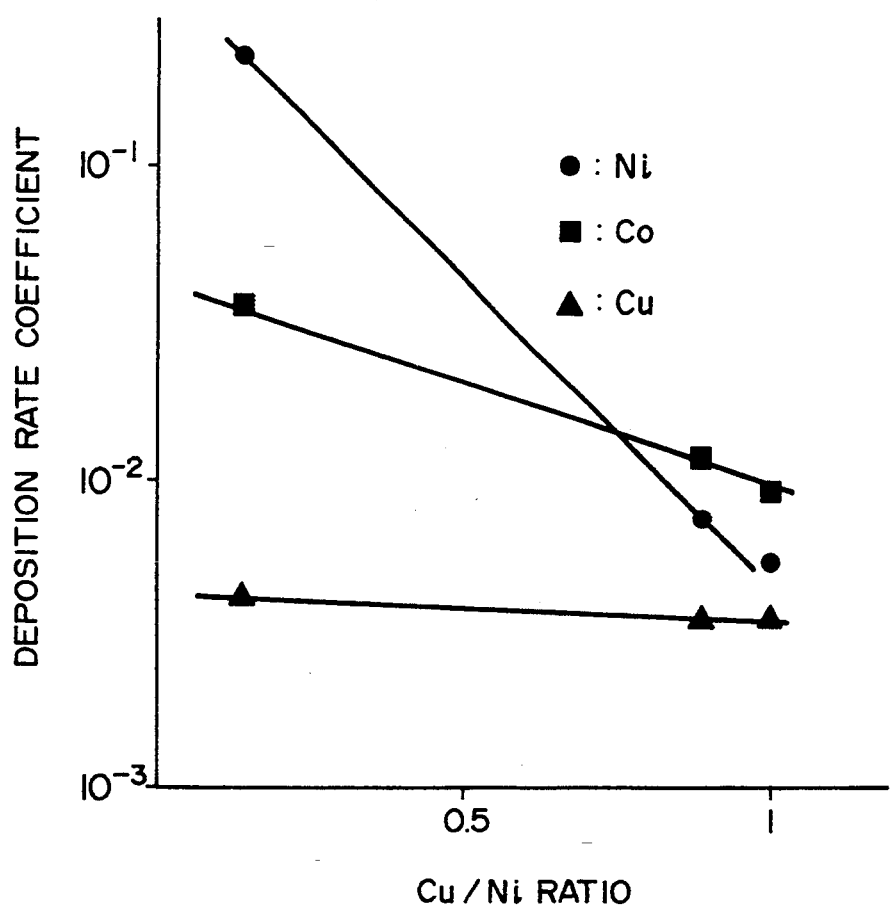
FIG. 5 illustrates change of the deposition rate coefficient when the addition ratio of copper is changed.

An embodiment of the present invention will now be described with reference to FIG. 1. FIG. 1 schematically illustrates the system of a primary cooling system of a BWR plant according to the present invention. Vapor discharged from a turbine 1 is returned to water in a condenser 2, condensed water discharged from the condenser 2 being then passed through a condensed water filter 4 by a condensed water pump 3. Then, impurities in the filtered water are removed by a condensed water demineralizer 5. The condensed water filter 4 comprises a precise filter having hollow fiber to remove iron-crud contained in condensed water. Purified water is passed through a water supply pump 6, a low pressure supplied water heater 7, a pressure raising pump 8 and a high pressure supplied water heater 9, the water thus-passed being then introduced into a pressure container 10 for a nuclear reactor. Since a major portion of the immunities contained in condensed water is removed by the condensed water filter 4 and the condensed water demineralizer 5, metal impurities generated due to corrosion of the pipes of the supplied water heating system is the major portion of the impurities contained in the supplied water. Since the major portion of material of this system, which is in contact with water, is stainless steel, the impurities are components eluted from the stainless steel. The material is also corroded in the pressure container 10 for the nuclear reactor. Since the material of the pressure container 10 for the nuclear reactor, which is in contact with water, is also stainless steel, impurities generated in this area are components eluted from the stainless steel. A part of these impurities is removed by a reactor water clean-up system 12 connected to a pipe branched from an upstream position of a recirculating pump 11 for the nuclear reactor. A nuclear fuel 13 is loaded into the pressure container 10 for this nuclear reactor and water is being boiled in it, causing metal ions to deposit to the fuel 13. In order to prevent this, a copper electrolysis device 15 which generates copper ions is disposed to add, to water discharged from the condensed water demineralizer 5 by way of an adjustment valve 14, copper ions by a required quantity. Further, the concentrations of copper ions and nickel ions adjacent to an inlet port of the reactor water clean-up system 12 is monitored by making use of a sampling pipe 16 through which water is sampled to be analyzed by a metal ion analyzing device 17. The metal ion analyzing apparatus 17 may be an ion chromatography that transmits a signal denoting the result of the analysis to a data processing device 18 so that the Cu/Ni ratio is calculated. In accordance with the obtained Cu/Ni ratio, the adjustment valve 14 is adjusted so that the quantity of injection of the copper ions is adjusted. As a result, the Cu/Ni ratio can be adjusted to be in a predetermined range. FIG. 5 shows results of experiments carried out to examine the influence of the Cu/Ni ratio upon the deposition rate coefficient by using an experimental device simulated to the reactor water conditions. As can be understood from FIG. 5, control so made that the Cu/Ni ratio is 1 can suppress the deposition of nickel and cobalt to the nuclear fuel rod and can maintain the radioactive concentration of the reactor water at a low level. Therefore, this embodiment enables the quantity of additive metals to be reduced, deposition and activation of the crud to the nuclear fuel rod to be suppressed and the radioactive level of the reactor water to be lowered.

Figure 6:
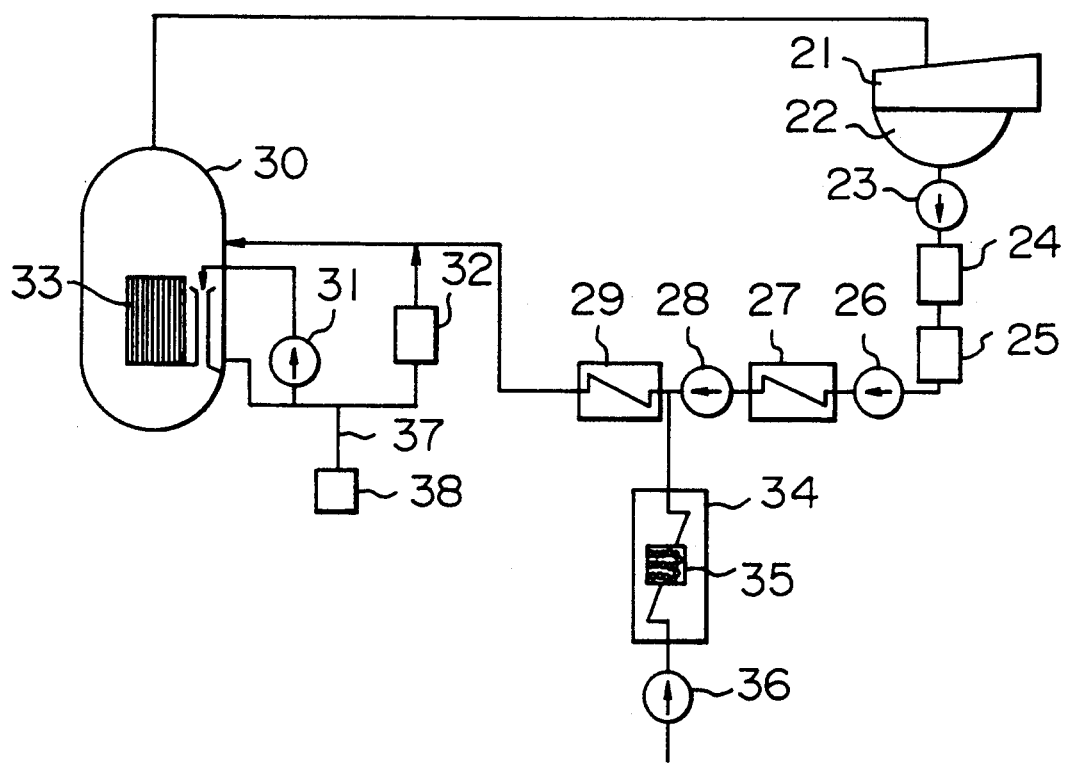
FIG. 6 illustrates another embodiment of the present invention.

Another embodiment of the present invention will now be described with reference to FIG. 6. Vapor discharged from a turbine 21 is returned to water in a condenser 22, the condensed water being passed through a condensed water filter 24 by a condensed water pump 23 to reach a condensed water demineralizer 25 in which the impurities contained therein are removed. Cleaned-up water passes a water supply pump 26, a low pressure supplied water heater 27, a pressure raising pump 28 and a high pressure supplied water heater 29 and is introduced into reactor pressure container 30. A portion of impurities in the reactor water is removed by a reactor water clean-up system 32 connected to a pipe branched from a position upstream of the reactor recirculation pump 31. Further, a nuclear fuel 33 is loaded into the reactor pressure container 30. An additive metal source 35 is disposed in a metal eluting heater 34, the additive metal source 35 being filled with bismuth particles. The metal eluting heater 34 is supplied with pure water from a water supply pump 36 so that the additive metal source 35 is exposed to water heated to about 90° C., so that bismuth ions are eluted. Tin ion as generated can be injected into a position in front of the high pressure supplied water heater 29. Further, water in the recirculation system is sampled through a sampling pipe 37, and bismuth ions in sampled water are captured by an ion capturing device 38 to analyze the concentration of the bismuth ions. In a case where the concentration of the bismuth ions is lower than a predetermined level, pure water is supplied from the water supply pump 36 to the additive metal source 35, so that bismuth ions are supplied to maintain the concentration of the bismuth ions in the reactor water. This embodiment is able to easily prevent deposition of crud to the nuclear fuel rod by using readily elutable metal, and the radioactive concentration level can be decreased.

Figure 7:
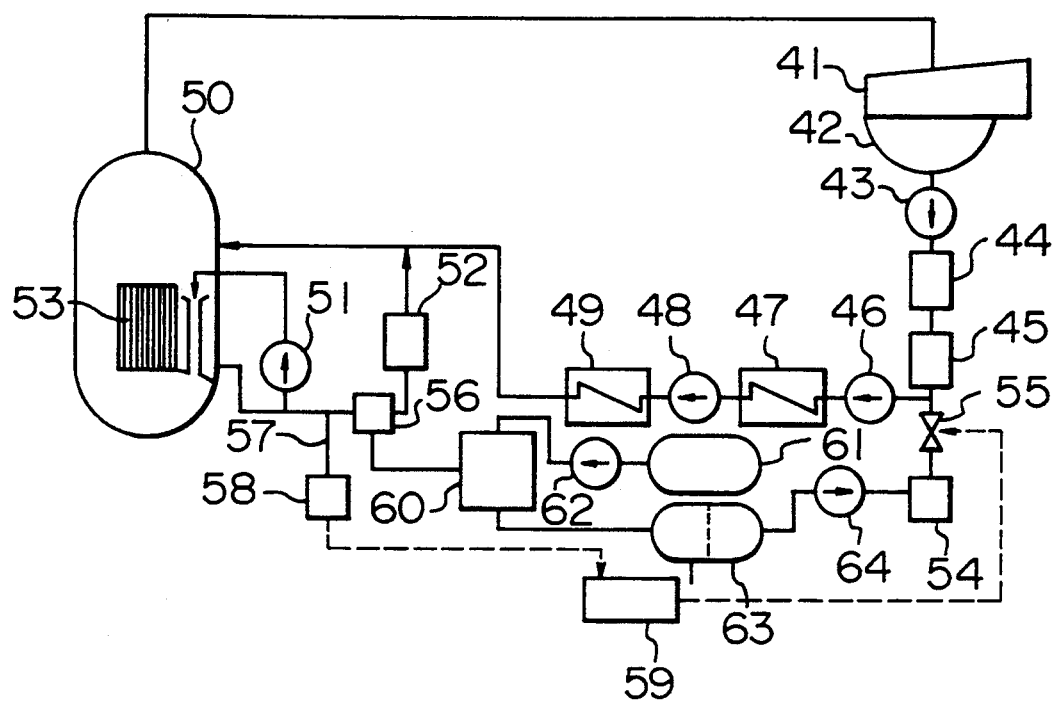
FIG. 7 illustrates an embodiment according to the present invention in which a condensed isotope is used.

An embodiment of the present invention that uses enriched isotopes will now be described with reference to FIG. 7. Vapor discharged from a turbine 41 is returned to water by a condenser 42, condensed water being then made to pass a condensed water filter 44 by a condensed water pump 43. Then, impurities contained in filtered water is removed by a condensed water demineralizer 45. Cleaned-up water passes a water supply pump 46, a low pressure supplied water heater 47, a pressure raising pump 48 and a high pressure supplied water heater 49 and is introduced into a nuclear reactor pressure container 50. A portion of impurities in reactor water is removed by a reactor water clean-up system 52 connected to a pipe branched from a position upstream of the reactor recirculation pump 51. Further, a nuclear fuel 53 is loaded into the reactor pressure container 50. The condensed water filter 44 and the reactor water clean-up system 52 accurately remove crud so that the concentration of iron crud contained in reactor water is maintained at 0.05 ppb or lower. A solution of germanium salt obtained by condensing $^{70}$Ge, the natural content ratio of which is 20.52%, to 99.9% is injected from an additive metal injecting apparatus 54 while adjusting the quantity of the injection by an adjustment valve 55. A chelate resin tower 56 is disposed in front of the reactor water clean-up system 52 to adsorb germanium. The concentrations of germanium ions and nickel ions at a position adjacent to an inlet port of the reactor water clean-up system 52 are monitored by sampling water from a sampling pipe 57 to be analyzed by a metal ion analyzing apparatus 58. A signal denoting the result of the analysis and transmitted from the metal ion analyzing apparatus 58 is supplied to a data processing apparatus 59 to calculate the Ge/Ni ratio. In accordance with the calculated Ge/Ni ratio, the adjustment valve 55 is adjusted to adjust the quantity of injection of germanium ions. As a result, the Ge/Ni ratio in the reactor water is adjusted to a value between 1 and 2. The chelate resin in the chelate resin tower 56 is conveyed to an additive metal recovery device 60 during a periodic inspection in such a manner that it is sent from an eluted solution tank 61 to the additive metal recovery device 60 by making use of an eluted solution pump 62 to elude germanium. The eluted solution is sent to a condensing and recovery device 63 to be converted into a solution of condensed germanium salt. The solution of condensed germanium salt is, by a recycle pump 64, sent to the additive metal injecting device 54, and then again injected into the reactor. Although germanium has various isotopes, $^{70}$Ge is EC-decayed and converted into stable $^{71}$Ga that does not emit $\gamma$-rays even in a case where it is activated by neutrons. Therefore, a problem of the exposure does not occur. This embodiment enables high-priced isotopes to be effectively used to prevent activation due to deposition of crud to the nuclear fuel rod. Further, the radioactive concentration level can be lowered.

According to the present invention, the deposition of corrosion products mainly composed of radioactive ions deposited to the nuclear fuel rod can be prevented.

Further, the radioactive concentration level in the reactor water can be lowered.

Although the invention has been described its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A method of operating a boiling water reactor plant comprising the step of:

injecting, into reactor water, metal element that decreases deposition of corrosion products onto a nuclear fuel rod during operation of said boiling water reactor plant.

2. A method of operating a boiling water reactor plant comprising the step of:
injecting, into a reactor core, metal element that enhances dissolving of corrosion products from a nuclear fuel rod during operation of said boiling water reactor plant.

3. A method of operating a boiling water reactor plant comprising the step of:
injecting, into reactor water, metal element that decreases a deposition rate coefficient of corrosion products to a fuel rod during operation of said boiling water reactor plant.

4. A method of operating a boiling water reactor plant according to claim 3, wherein said corrosion products are cobalt ions and said deposition rate coefficient is not more than 0.01.

5. A method of operating a boiling water reactor plant according to claims 1, 2 or 3, wherein solubility of an oxide or a hydroxide of said metal element into pure water is smaller than that of $Na_2O$.

6. A method of operating a boiling water reactor plant comprising the step of:
injecting, into reactor water, metal element during operation of said boiling water reactor plant, solubility of an oxide of said metal element or a hydroxide of the same into pure water being larger Than that of NiO and smaller than that of $Na_2O$.

7. A method of operating a boiling water reactor plant according to claims 1, 2 or 3, wherein said metal element does not react with an iron oxide so that no ferrite is generated.

8. A method of operating a boiling water reactor plant according to claims 1, 2 or 3, wherein said corrosion products are cobalt ions or nickel ions.

9. A method of operating a boiling water reactor plant according to claims 1, 2 or 3, wherein said metal element is at least one element selected from the group consisting of copper, tin, bismuth, cadmium, germanium, selenium, mercury, arsenic, gallium, chromium, manganese, lead, antimony, vanadium and tellurium.

10. A method of operating a boiling water reactor plant according to claims 1, 2 or 3, wherein said metal element is used by condensing only a specific isotope selected form isotopes of said metal element.

11. A method of operating a boiling water reactor plant according to claims 1, 2 or 3 further comprising the step of:
decreasing the concentration of iron crud contained in reactor water.

12. A method of operating a boiling water reactor plant according to claim 11, wherein said concentration of said iron crud is not more than 0.05 ppb.

13. A method of operating a boiling water reactor plant comprising the step of:
reducing the concentration of iron crud contained in reactor water by means of filtration with a hollow fiber filter in a reactor water clean-up system or a condenser system.

14. A method of operating a boiling water reactor plant comprising the steps of:
removing iron crud contained in a primary cooling system before operation; and
injecting, into reactor water, metal element chat decreases deposition of corrosion products to a nuclear fuel rod during operation of said boiling water reactor plant.

15. A method of operating a boiling water reactor plant comprising the steps of:
decontaminating a ferrite layer having radioactive corrosion products in a reactor before operation of said boiling water reactor plant; and
injecting, into reactor water, metal element that decreases deposition of corrosion products to a nuclear fuel rod during operation of said boiling water reactor plant.

16. A method of operating a boiling water reactor plant according to claims 1, 2, 3, 14 or 15, wherein ion concentration of said metal element is detected and quantity of injection of said metal element is controlled so that said ion concentration is in a predetermined range.

17. A method of operating a boiling water reactor plant according to claims 1, 2, 3, 14 or 15, wherein said ion concentration of said metal element and the concentration of nickel ions are detected, an index being calculated in accordance with said two concentrations, and quantity of injection of said metal element being controlled so that said index is in a predetermined range.

18. A method of operating a boiling water reactor plant comprising the steps of:
injecting, into reactor water, metal element that decreases deposition of corrosion products to a nuclear fuel rod during operation of said boiling water reactor plant;
monitoring ion concentration of said metal element and concentration of nickel ions which are said corrosion products to calculate a ratio of said two concentrations; and
adjusting quantity of injection of said metal element so that said ratio is in a predetermined range.

19. A boiling water reactor plant comprising:
means for injecting, into reactor water, metal element that decreases deposition of corrosion products to a nuclear fuel rod.

20. A boiling water reactor plant comprising:
means for injecting, into a reactor core, metal element that enhances dissolving of corrosion products from a nuclear fuel rod.

21. A boiling water reactor plant comprising:
means for injecting metal element into reactor water, solubility of an oxide of said metal element or a hydroxide of the same into pure water being larger than that of NiO and smaller than that of $Na_2O$.

22. A boiling water reactor plant according to claims 19, 20 or 21 further comprising:
means for removing iron crud in a primary cooling system.

23. A boiling water reactor plant according to claim 22, wherein said removing means is a hollow fiber filter in a reactor water clean-up system or a condenser system.

24. A boiling water reactor plant according to claims 19, 20 or 21 further comprising:
means for detecting ion concentration of said metal element in reactor water or water in a recirculation system; and
means for controlling quantity of injection of said metal element in accordance with an output from said detection means.

25. A boiling water reactor plant according to claims 19, 20 or 21 further comprising:
means for detecting ion concentration of said metal element in reactor water and concentration of nickel ions which are corrosion products; and means for obtaining a ratio of said two concentrations in accordance with an output from said detection means to thereby adjust the quantity of injection of said metal element in accordance with said ratio.

26. A boiling water reactor plant according claims 19, 20 or 21, wherein said injection means comprises an electrolytic device for generating ions from said metal element and a device for injecting said ions.

27. A boiling water reactor plant according to claims 19, 20 or 21, wherein said injection means includes a device for heating water, a device for holding a solid chemical compound that contains said metal element, and a device for injecting said solid compound into heated water.

28. A boiling water reactor plant according to claims 19, 20 or 21, wherein said injection means is connected between an outlet port of a reactor water clean-up system and an inlet port of a reactor core.

29. A boiling water reactor plant according to claims 19, 20 or 21 further comprising means for recovering said metal element from ion exchange resin of a reactor water clean-up system.

30. A method of operating a boiling water reactor plant according to claims 19, 20 or 21, wherein said metal element is at least one element selected from a group consisting of copper, tin, bismuth, cadmium, germanium, selenium, mercury, arsenic, gallium, chrome, manganese, lead, antimony, vanadium and tellurium.

31. A metal injection apparatus comprising:
an electrolytic device for generating ions from metal; and
a device for injecting said ions into a boiling water reactor plant.

32. A metal injection apparatus comprising:
a device for heating water;
a device for holding a solid chemical compound that contains said metal;
a device for injecting said solid compound into heated water; and
a device for injecting an output from said injection device into a boiling water reactor plant.

* * * * *